(12) United States Patent
Becker

(10) Patent No.: US 10,595,506 B2
(45) Date of Patent: Mar. 24, 2020

(54) MATERIAL SPREADER BUCKET FOR LOADERS

(71) Applicant: Harry H. Becker, Narvon, PA (US)

(72) Inventor: Harry H. Becker, Narvon, PA (US)

(*) Notice: Subject to any disclaimer, the term of this patent is extended or adjusted under 35 U.S.C. 154(b) by 365 days.

(21) Appl. No.: 15/599,650

(22) Filed: May 19, 2017

(65) Prior Publication Data
US 2017/0339918 A1 Nov. 30, 2017

Related U.S. Application Data

(60) Provisional application No. 62/341,861, filed on May 26, 2016.

(51) Int. Cl.
| | | |
|---|---|---|
| *A01K 5/00* | (2006.01) | |
| *B01F 7/00* | (2006.01) | |
| *B01F 7/08* | (2006.01) | |
| *B01F 13/00* | (2006.01) | |
| *E02F 3/407* | (2006.01) | |
| *A01K 1/015* | (2006.01) | |
| *B01F 7/04* | (2006.01) | |
| *A01C 3/06* | (2006.01) | |
| *E01C 19/20* | (2006.01) | |
| *A01C 17/00* | (2006.01) | |

(52) U.S. Cl.
CPC .............. *A01K 5/002* (2013.01); *B01F 7/004* (2013.01); *B01F 7/00258* (2013.01); *B01F 7/04* (2013.01); *B01F 7/08* (2013.01); *B01F 13/0037* (2013.01); *E02F 3/407* (2013.01); *A01C 3/063* (2013.01); *A01C 17/001* (2013.01); *A01K 1/015* (2013.01); *A01K 5/001* (2013.01); *E01C 19/203* (2013.01)

(58) Field of Classification Search
CPC ........ A01K 5/002; A01K 5/001; A01K 1/015; B01F 7/00258; B01F 7/004; B01F 7/04; B01F 7/08; B01F 13/0037; E02F 3/407; E01C 19/203; E01C 2019/209; E01C 19/202; A01D 41/1243; A01C 3/063; A01C 15/16; A01C 17/001; A01C 17/003
USPC ......................... 239/650, 673, 676; 460/111
See application file for complete search history.

(56) References Cited

U.S. PATENT DOCUMENTS

| | | | | |
|---|---|---|---|---|
| 3,232,627 A | * | 2/1966 | Larson ..................... | A01C 7/16 239/666 |
| 4,261,520 A | * | 4/1981 | Hetrick ................. | E01C 19/203 222/413 |

(Continued)

*Primary Examiner* — Alexander M Valvis
*Assistant Examiner* — Joseph A Greenlund
(74) *Attorney, Agent, or Firm* — Miller Law Group, PLLC

(57) ABSTRACT

A loader bucket has material spreaders on opposing sides of the loader bucket to spread material from within the loader bucket received through discharge openings in the rear wall of the bucket from an auger located in the bottom of the bucket. Each material spreader includes a spinner formed with blades to spread the material received through the discharge openings. The material spreaders are positioned below the apex of the V-shaped bucket and operable within a path of distribution that includes an interior boundary member oriented with a forward end closer to the center of the bucket than the rearward end to provide a distribution forwardly and laterally of the bucket. A low baffle mounted at the bottom periphery of the spinner blades forces material upwardly into a fluffy pattern. A high baffle provides a second boundary limit for the distribution of material.

6 Claims, 13 Drawing Sheets

(56) References Cited

U.S. PATENT DOCUMENTS

| | | | |
|---|---|---|---|
| 5,375,773 A * | 12/1994 | Lewis | B60R 9/065 224/404 |
| 5,957,394 A * | 9/1999 | Becker | A01K 5/002 239/288.3 |
| 5,988,535 A * | 11/1999 | Kime | E01H 10/007 239/172 |
| 6,220,532 B1 * | 4/2001 | Manon | A01C 15/18 239/672 |
| 6,378,793 B1 * | 4/2002 | Lantz | A01C 15/122 239/672 |
| 6,598,812 B1 * | 7/2003 | Matousek | A01D 41/1243 239/682 |
| 6,648,250 B2 * | 11/2003 | Garnett | A01C 3/06 239/667 |
| 6,656,038 B1 * | 12/2003 | Persson | A01D 41/1243 460/112 |
| 6,817,552 B2 * | 11/2004 | Kinkead | A01C 17/001 239/668 |
| 7,712,233 B2 * | 5/2010 | Nesseth | A01C 15/16 222/412 |
| 7,927,200 B2 * | 4/2011 | Van Overschelde | A01F 12/40 460/112 |
| 8,029,347 B2 * | 10/2011 | Pohlmann | A01D 41/1243 460/112 |
| 8,210,915 B2 * | 7/2012 | Holmen | A01F 12/40 460/112 |
| 8,282,026 B1 * | 10/2012 | Malicky | A01K 1/015 239/673 |
| 8,511,589 B2 * | 8/2013 | Richardson | E01H 10/007 239/662 |
| 9,370,141 B2 * | 6/2016 | Isaac | A01F 12/30 |
| 10,212,882 B2 * | 2/2019 | Mayerle | A01F 12/10 |
| 2002/0117562 A1 * | 8/2002 | Kost | A01C 17/001 239/666 |
| 2003/0098373 A1 * | 5/2003 | Smith | A01C 15/16 239/668 |
| 2005/0173568 A1 * | 8/2005 | Schoenfeld | A01C 17/001 239/650 |
| 2010/0291985 A1 * | 11/2010 | Pohlmann | A01D 41/1243 460/112 |
| 2011/0045883 A1 * | 2/2011 | Weichholdt | A01D 41/1243 460/112 |
| 2011/0168800 A1 * | 7/2011 | Warchola | E01C 19/203 239/7 |
| 2013/0263565 A1 * | 10/2013 | Yde | A01D 41/1243 56/122 |
| 2017/0339918 A1 * | 11/2017 | Becker | A01K 5/002 |

* cited by examiner

MATERIAL SPREADER BUCKET FOR LOADERS

CROSS-REFERENCE TO RELATED APPLICATIONS

This application claims domestic priority on U.S. Provisional Patent Application Ser. No. 62/341,861, filed on May 26, 2016, the content of which is incorporated herein by reference.

FIELD OF THE INVENTION

This invention relates generally to a bucket attachable to loaders and operable to spread various materials, and, more particularly, to loader bucket provided with material spreading devices that spread bedding material in a free stall barn.

BACKGROUND OF THE INVENTION

In dairy operations, cows are placed in stalls on opposite sides of a central access way. The cows require bedding material to be placed in the stalls to provide a comfortable place to lie down and rest. This bedding material is typically a dry, free flowing particulate material such as sawdust or chopped straw. The bedding material can be placed by hand or through mechanical devices that throw the bedding material laterally into the stalls. One problem with the placement of bedding material with mechanical devices is the actual placement of the bedding material in the stall areas, as bedding material is preferably placed in a uniform manner over the stall area.

Chicken houses are another farm operation in which bedding material is needed to cover the floor for the safety and comfort of the chickens housed therein. Unlike dairy operations, the bedding material needs to be spread uniformly over the floor of the chicken house as the chickens are free to roam throughout the chicken house to eat from the feeders and to drink from the waterers. Although mechanical devices are utilized to spread bedding material in chicken houses, the uniformity of the spread pattern over the floor is a significant concern.

One such mechanical device for the placement of bedding material can be found in U.S. Pat. No. 6,648,250, granted to Andrew Gannett on Nov. 18, 2003, in which the apparatus is a bucket that can be manipulated to be lowered to scoop up the bedding material and then oriented into an upright orientation to operate the spreader spinners that discharge the bedding material laterally into the stall areas. The spreader spinners are mounted on the lateral ends of the bucket and receive the bedding material from an auger at the bottom of the bucket. The drive mechanism for the spinners is mounted below the bucket in an area that subjects the drive mechanism to damage from operation of the bucket, particularly when the bucket is lowered to scoop the bedding material into the interior of the bucket.

Another particulate material spreading device that is operable for the placement of bedding material in barns and chicken houses can be found in U.S. Pat. No. 7,712,233, granted to Clinton A. Nesseth, on May 11, 2010. The Nesseth apparatus is also a bucket mountable on a skid steer loader that can be lowered to scoop bedding material into the interior of the bucket and then placed upright to utilize spreader spinners mounted on the ends of the bucket to distribute the bedding material laterally to both sides of the bucket, which is particularly adapted for the placement of bedding material into barn stalls. The spreader spinners on the Nesseth apparatus are located at the ends of the bucket and at the plane of the front side of the bucket that is placed adjacent the floor when loading bedding material into the interior of the bucket. As a result, the spinners are located in at a position that subjects the spinners to being damaged while the bucket is lowered to load material into the bucket.

In U.S. Pat. No. 5,957,394, granted to Harry Becker on Sep. 28, 1999, the bucket is also adapted for mounting on a loader, particularly a skid steer loader, so that the bucket can be lowered to scoop bedding material into the interior of the bucket. An auger at the bottom of the V-shaped bucket conveys the bedding material to the ends of the bucket where spreader spinners are mounted to distribute the flow of bedding material laterally from the apparatus. The spinners are mounted well above the plane of the front side of the bucket so that the spinners are not subjected to damage during the loading operation with the front side of the bucket lowered to the floor.

It would be desirable to provide a bedding material spreader that is part of a loader bucket that can be operated to load bedding material into the bucket where the spreader spinners are operable to provide a more uniform spread of bedding material across the floor of the dairy barn or of the chicken house in which the spreader apparatus is operated to provide a layer of bedding material for use in the farming operation.

SUMMARY OF THE INVENTION

It is an object of this invention to overcome the disadvantages of the prior art by providing a loader bucket that can be operated to discharge bedding material across the floor of a building structure for use in farming operations.

It is another object of this invention to incorporate bedding spreading apparatus into a loader bucket to provide the ability to spread the bedding material loaded into the bucket.

It is a feature of this invention that the loader bucket is provided with an auger rotatably positioned at the bottom of the bucket to discharge bedding material within the confines of the loader bucket through two opposing discharge openings.

It is an advantage of this invention that the auger is provided with flighting that conveys the bedding material in opposing directions from the center of the auger.

It is another feature of this invention that the discharge openings are in the rear wall of the bucket to discharge bedding material into spinners located at opposing sides of and below the loader bucket.

It is another advantage of this invention that the spinners are located below the bottom apex of the loader bucket cavity to enable the discharge of bedding material from the spinners into a spread pattern that covers the floor in front of the loader bucket and laterally thereof as well.

It is still another feature of this invention that the spinners are operable within a distribution channel having a first inward boundary member that is oriented in a manner so as to be non-parallel to the direction of travel.

It is still another advantage of this invention that the forward end of the boundary member is positioned closer to the center of the loader bucket than the rearward end to provide an open path of distribution that extends for more than 90 degrees along the forward and side faces of the spinner rotation to allow the bedding material to be spread both forwardly and laterally of the loader bucket.

It is still another advantage of this invention that the spinners are powered hydraulically through a hydraulic system supported on the loader bucket and connectable to a source of hydraulic power on the loader to which the loader bucket is mounted.

It is still another feature of this invention that the spinners are formed with a circular low baffle that is centered on the axis of rotation of the spinner and extends around the open distribution path for the spinner.

It is still another advantage of this invention that the low baffle has a height less than the height of the spinner blades to force a portion of the distribution of bedding material from the spinner blades into an upward direction.

It is yet another advantage of this invention that the low baffle causes the bedding material to be discharged from the spinners in a fluffy pattern that provides a uniform layer of distribution of the bedding material across the distribution path both forwardly and laterally from the spreader apparatus.

It is a further advantage of this invention that the distribution pattern of the spinners with the low baffle is advantageous in both free stall dairy barns and in chicken houses.

It is yet another feature of this invention that the spinners are also formed with a high baffle at the rear lateral side of the spinner with the high baffle having a height at least as high as the spinner blades.

It is yet another advantage of this invention that the high baffle blocks the movement of the bedding material from the spinner to provide a second boundary limit to the lateral distribution of the bedding material from the spinner.

It is still another object of this invention to provide a loader bucket incorporating a spreading mechanism that is operable to discharge the material within the loader bucket into a layer that is uniform and undisturbed both forwardly and laterally of the spreading mechanism and the loader bucket.

It is yet another object of this invention to provide a loader bucket incorporating a material spreading mechanism to discharge material from within the loader bucket wherein the loader bucket is durable in construction, inexpensive of manufacture, carefree of maintenance, facile in assemblage, and simple and effective in use.

These and other objects, features and advantages are accomplished according to the instant invention by providing a loader bucket having material spreaders on opposing sides of the loader bucket to spread material from within the loader bucket received through discharge openings in the rear wall of the bucket from an auger located in the bottom of the bucket. Each material spreader includes a spinner formed with blades to spread the material received through the discharge openings. The material spreaders are positioned below the apex of the V-shaped bucket and operable within a path of distribution that includes an interior boundary member oriented with a forward end closer to the center of the bucket than the rearward end to provide a distribution forwardly and laterally of the bucket. A low baffle mounted at the bottom periphery of the spinner blades forces material upwardly into a fluffy pattern. A high baffle provides a second boundary limit for the distribution of material.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
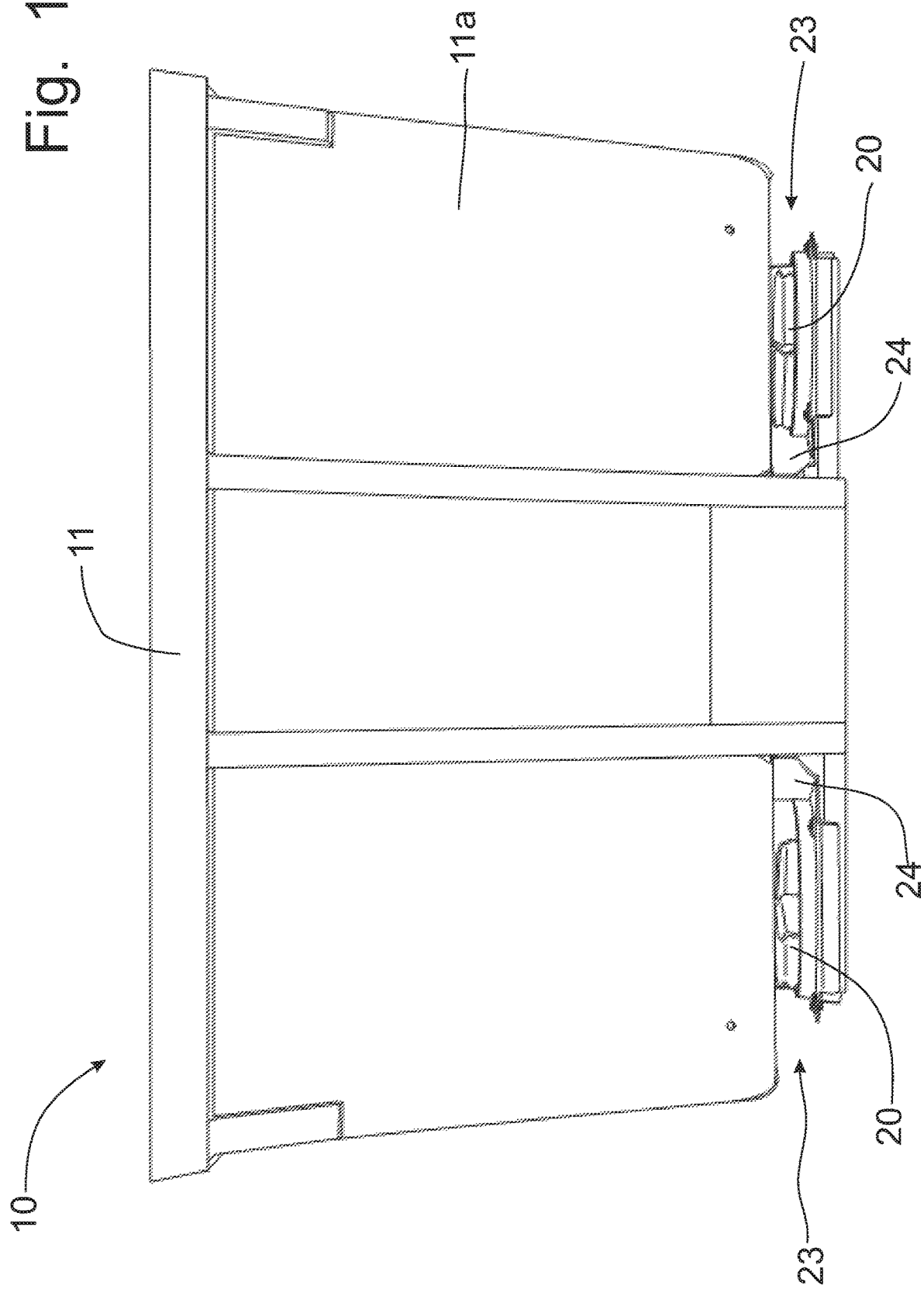
FIG. 1 is a front elevational view of the spreader bucket apparatus with the apparatus being in an upright orientation for spreading materials.

Referring now to the drawings, the structural components of a spreading apparatus for distributing bedding materials incorporating the principles of the instant invention can best be seen. Any left and right references are used as a matter of convenience and are determined by standing at the rear of the spreading apparatus, such as from the orientation from the operator compartment of the skid steer loader, and facing the forward direction, the normal direction of travel of the skid steer loader, with the spreading apparatus mounted on the forward end of the skid steer loader. One skilled in the art will understand that the principles of the instant invention are not limited to a skid steer loader and that the spreading apparatus could be mounted onto any loader that supplies a source of hydraulic power for connection to the hydraulically powered components, as will be described in greater detail below.

Figure 2:
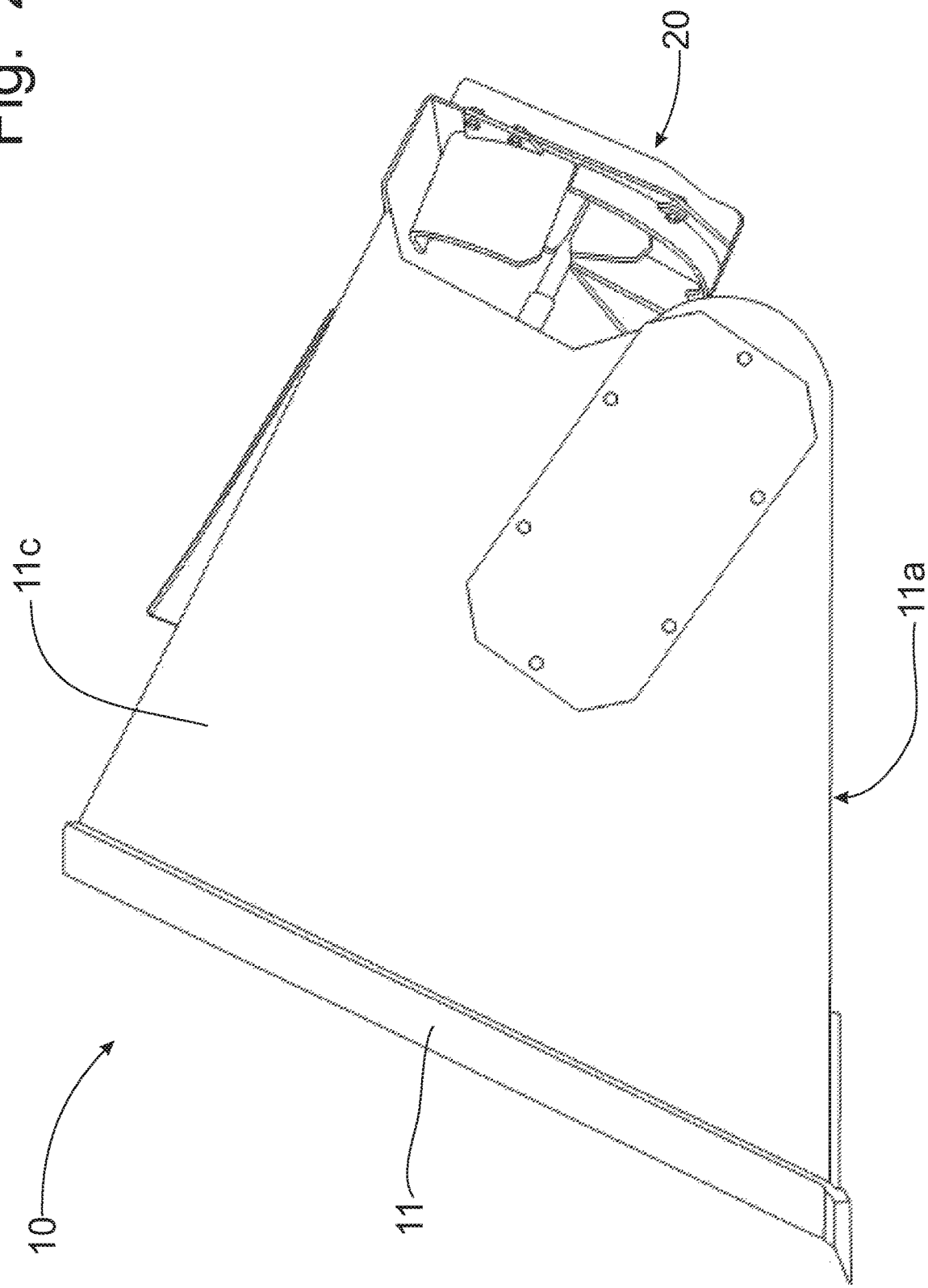
FIG. 2 is a left side elevational view of the spreader bucket apparatus in the lowered orientation to scoop material into the interior cavity of the bucket, the front wall shown in FIG. 1 is now oriented parallel to the ground.
Figure 3:
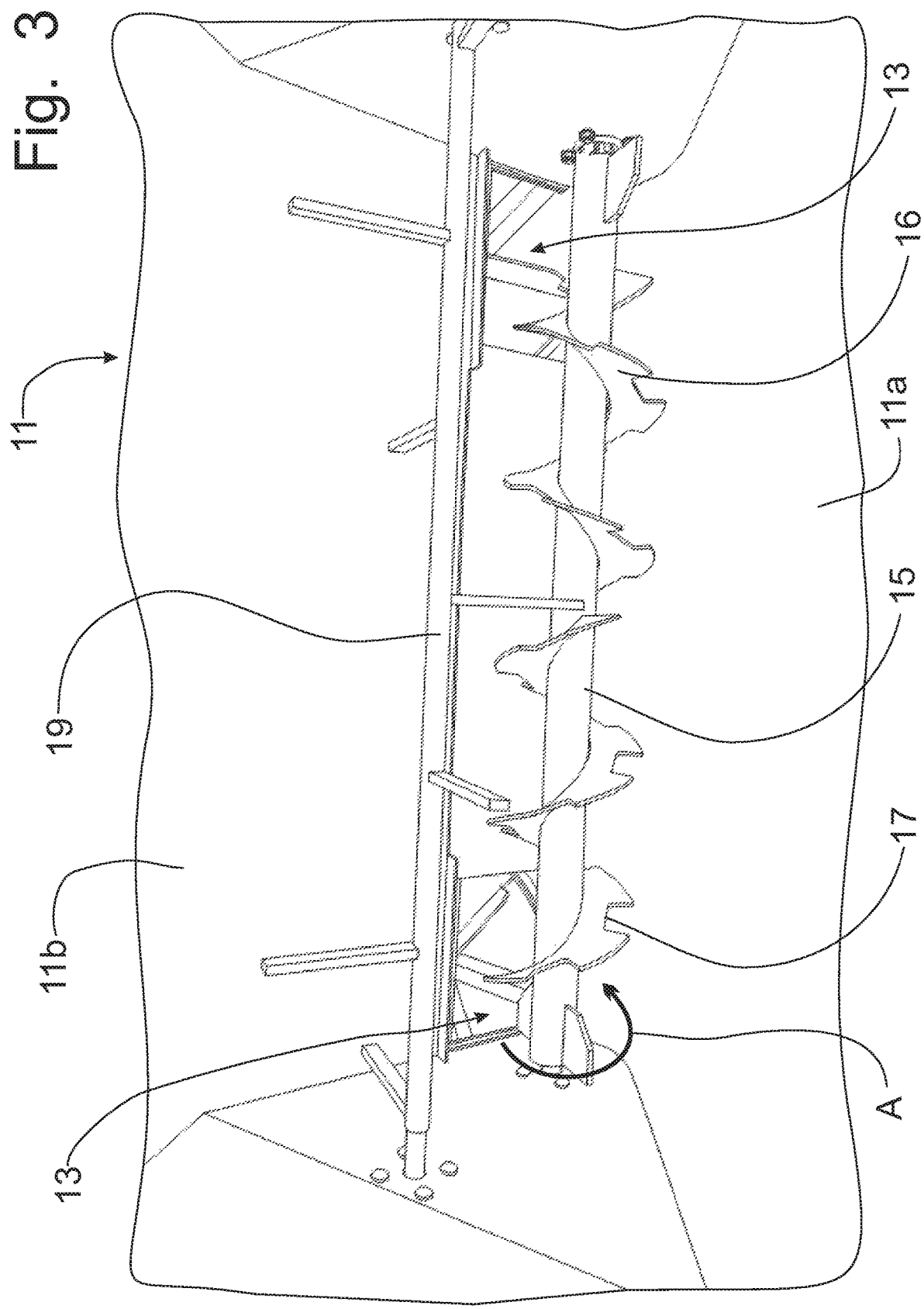
FIG. 3 is a partial upper perspective view showing the interior cavity of the spreader bucket apparatus with the auger being located near the apex of the bucket and the anti-bridging member being rotatably mounted above the auger.
Figure 4:
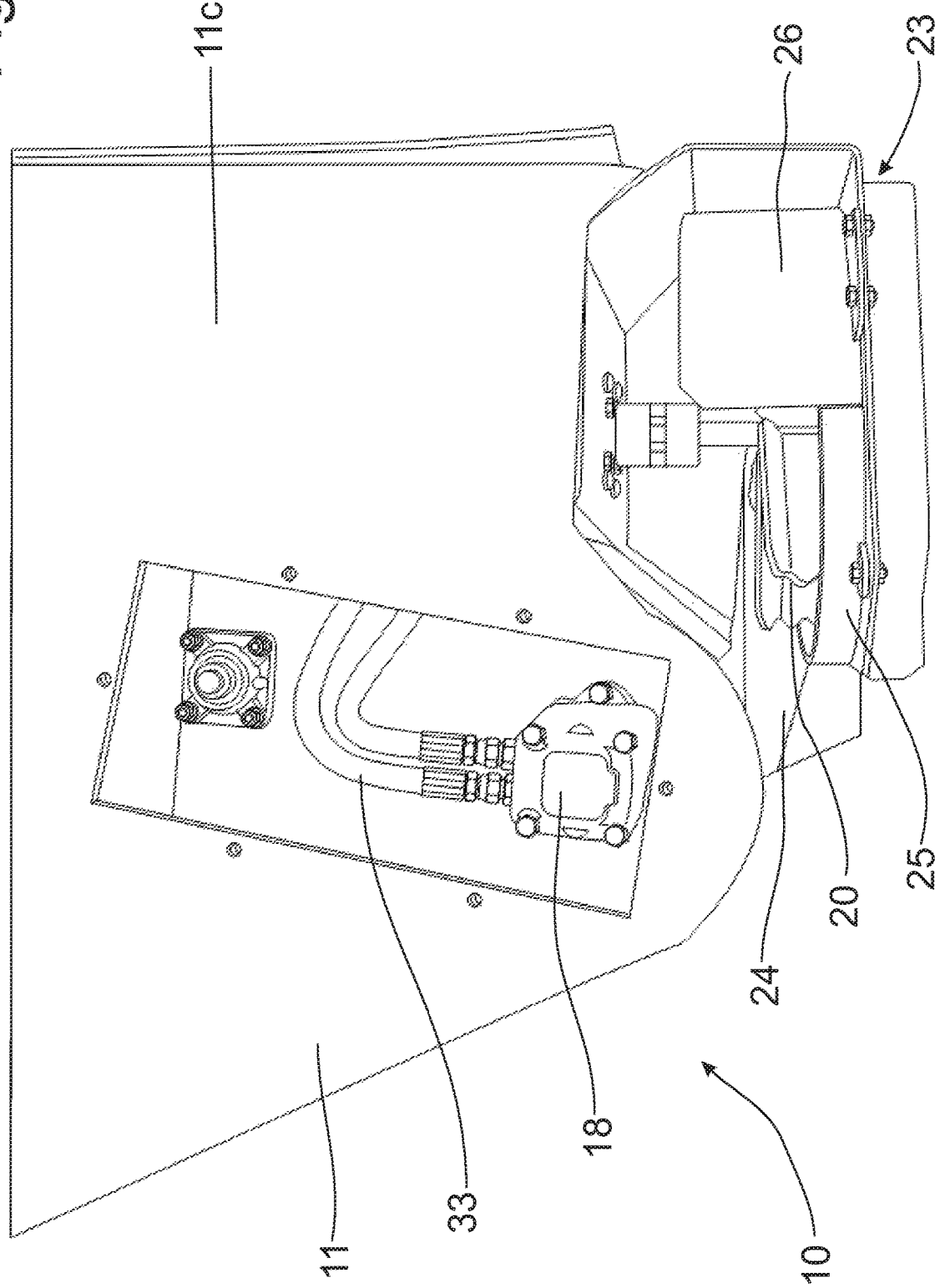
FIG. 4 is a left side elevational view of the spreader bucket apparatus in the upright position, a cover plate being removed to show the location of the hydraulic motor for driving the rotation of the auger.
Figure 5:
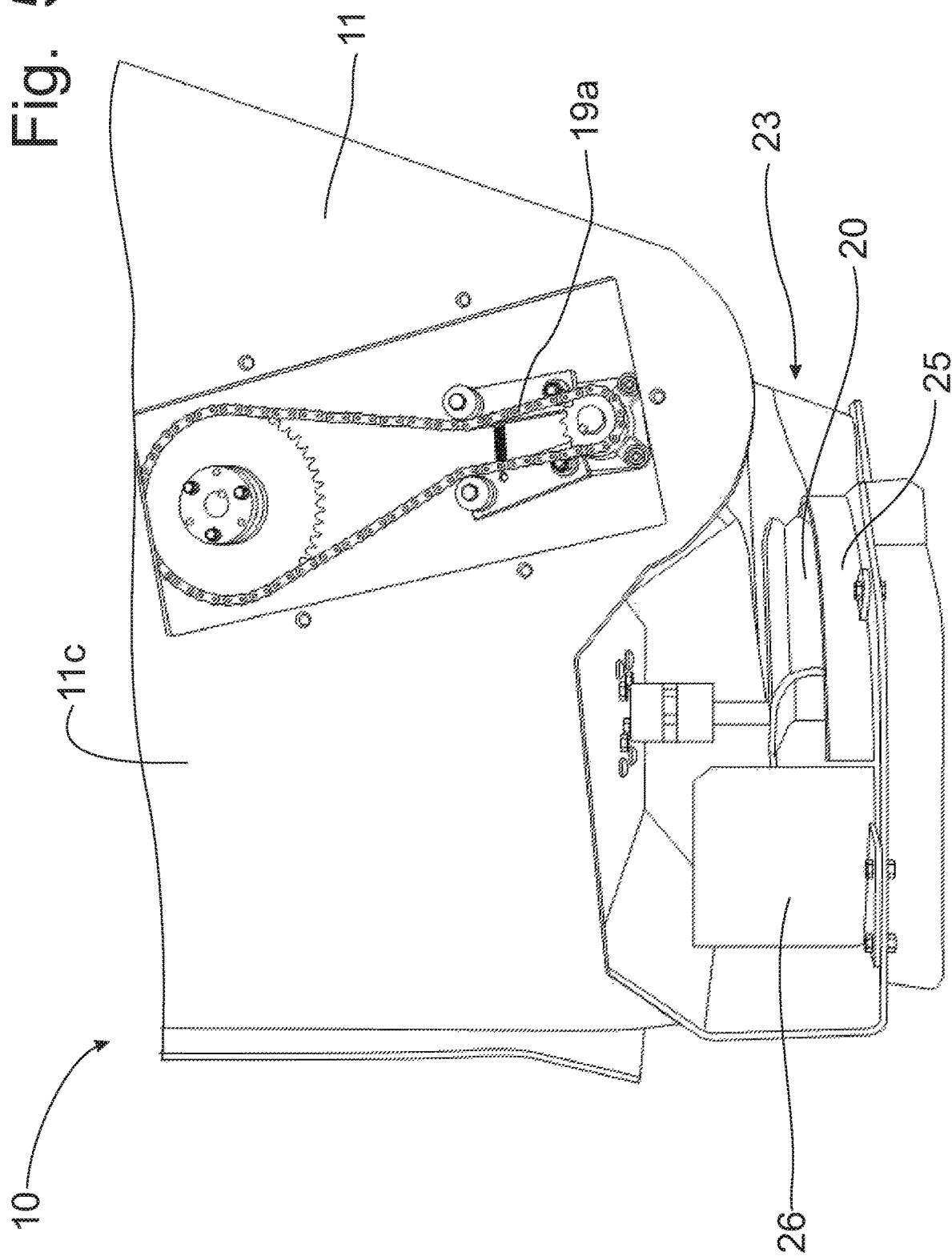
FIG. 5 is a right side elevational view of the spreader bucket apparatus, a cover plate being removed to show the location of the chain drive mechanism transferring rotational power from the rotated auger to the anti-bridging member.
Figure 6:
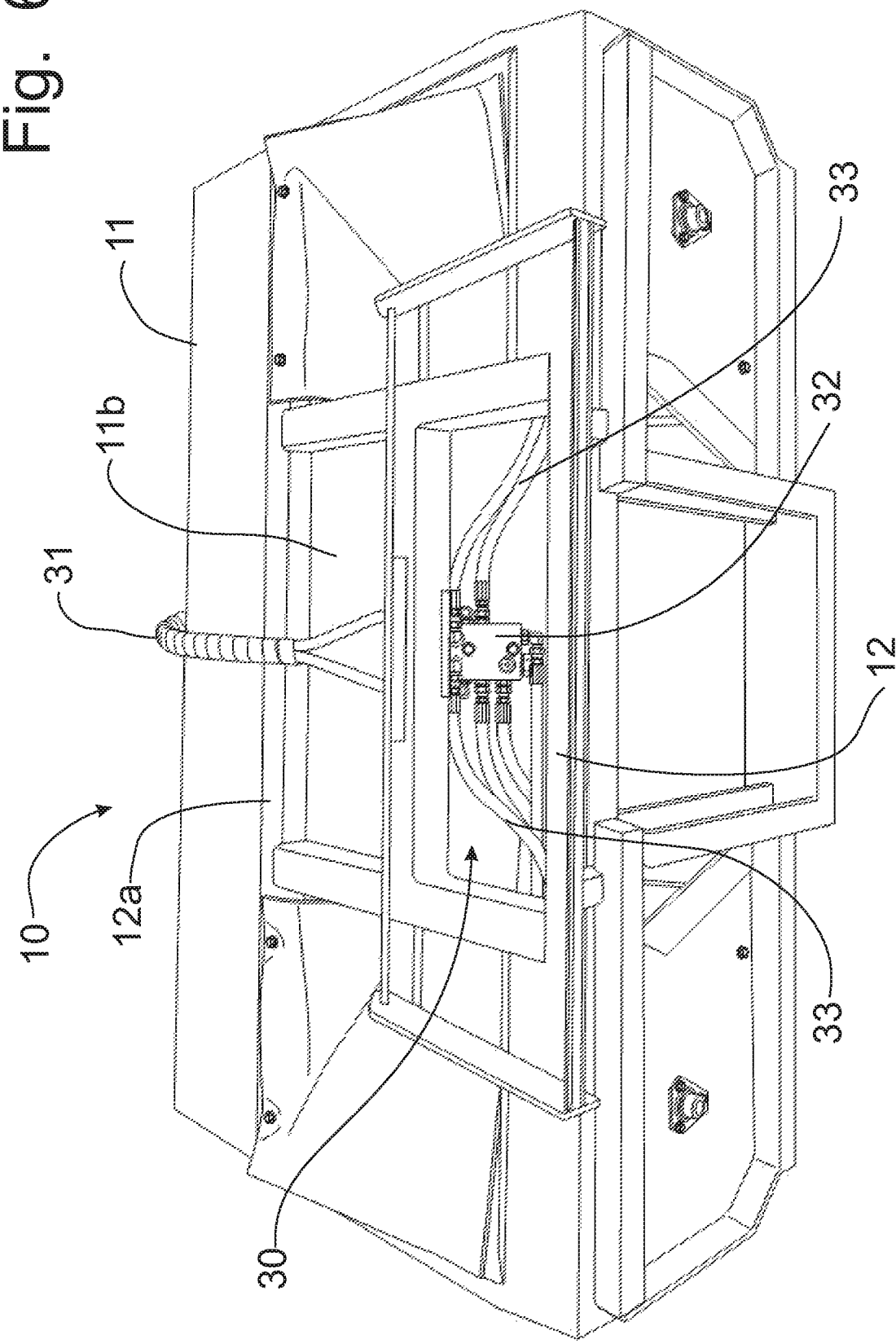
FIG. 6 is a lower, rear perspective view of the spreader bucket apparatus that depicts the diverter valve and the mounting bracket on the rear side of the bucket.

As best seen in FIGS. 1-6, the spreader apparatus 10 is formed as a loader bucket 11 that is mountable on a loader, such as a skid steer loader (not shown), to provide motive and operational power thereto. The loader bucket 11 is formed with a forward wall 11a, a rearward wall 11b and side walls 11c interconnecting the forward and rearward walls 11a, 11b, with the front and rearward and rearward walls 11a, 11b diverging upwardly from a lower apex to an opened top. The rearward side 11b of the bucket 11 is provided with the mounting apparatus 12 that is associated with being coupled to a conventional loader mounting plate, as will be recognized by one of ordinary skill in the art. The mounting apparatus 12 is supported on a frame 12a to present the mounting apparatus 12 in a vertical orientation for mating with a loader mounting plate. Once mounted on the mounting plate of a loader (not shown), the bucket 11 can be pivotally moved between a lowered position, as depicted in FIG. 2 where the forward side 11a of the loader bucket 11 is oriented parallel to the floor or the ground to scoop bedding material through the open top into the interior cavity of the bucket 11, and an upright position, as shown in FIGS. 4-6, in which the spreader apparatus 10 is used to distribute the collected bedding material, as is described in greater detail below.

Once the interior cavity of the loader bucket 11 is filled with appropriate bedding material, the bucket 11 is placed into the upright position and the hydraulically powered spinners 20 at the ends of the bucket 11 are operated to distribute the bedding material from within the bucket 11. As seen in FIG. 3, the interior of the bucket 11 is provided with an auger 15 at the lower apex of the V-shaped bucket 11 and an anti-bridging member 19 located above the auger 15. Both the auger 15 and the anti-bridging member 19 are rotatably mounted within the bucket 11 and powered hydraulically through the hydraulic motor 18 and associated drive mechanism 19a located on the opposing side walls 11c, as shown in FIGS. 4 and 5. The auger 15 is preferably formed with flighting 16 that is either notched with notches 17 or segmented, but the flighting 16 is spiraled in opposite directions from the center of the auger 15 to deliver the bedding material toward the opposing ends of the bucket 11.

The opposing ends of the rearward wall 11b of the bucket 11 are provided with openings 13 that have gate members 14 mounted on the outside of the bucket 11 to control the size of the opening 13 during operation thereof. The bedding material will flow from the interior of the bucket 11 through the opening 13 and onto the corresponding spinner 20 for distribution as is described in greater detail below. The gate members 14 are independently movable and can be manipulated to close one side of the bucket 11 relative to the opposing side of the bucket 11 so that the bedding material can be selectively distributed from only one of the spinners 20, if desired. Preferably, the auger 15 is rotated in a manner that causes the auger flighting 16 to feed the bedding material through the openings 13 in an undershot orientation, as is reflected by the arrow A in FIG. 3.

Figure 7:
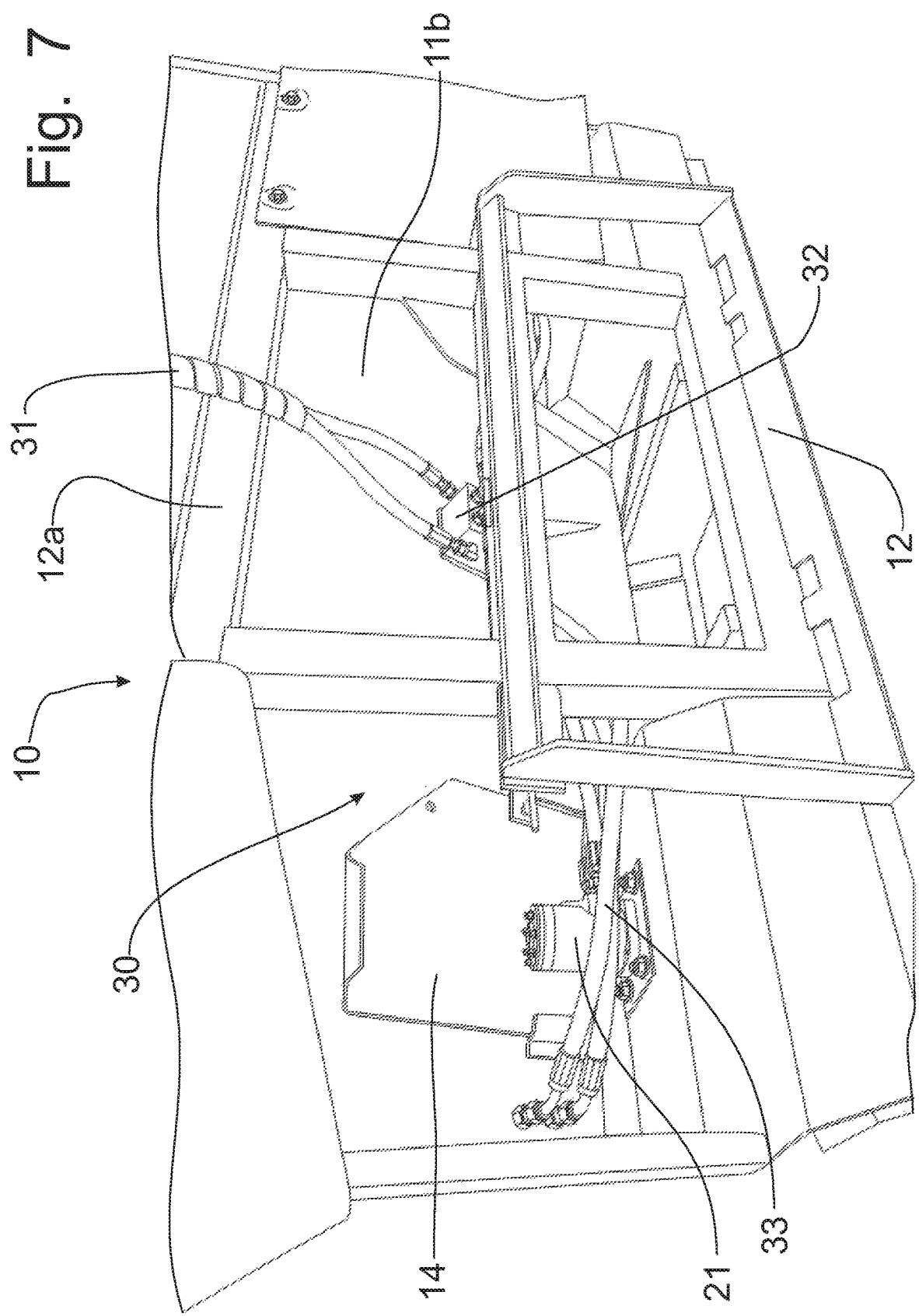
FIG. 7 is a partial left rear perspective view of the spreader bucket apparatus, a protective flap being lifted to show the location of the hydraulic motor powering the rotation of the left spinner.
Figure 8:
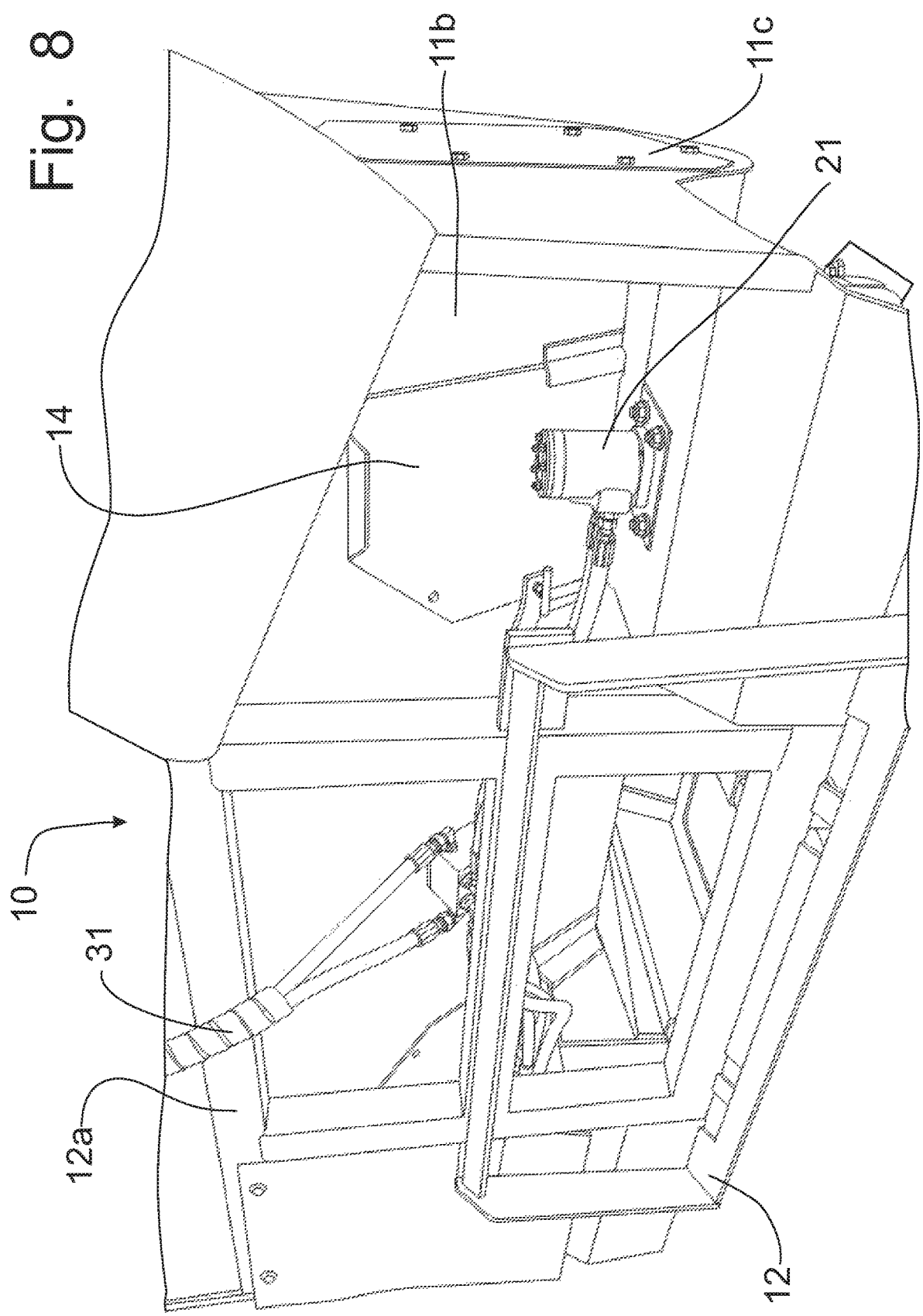
FIG. 8 is a partial right rear perspective view of the spreader bucket apparatus, a protective flap being lifted to show the location of the hydraulic motor powering the rotation of the right spinner.
Figure 9:
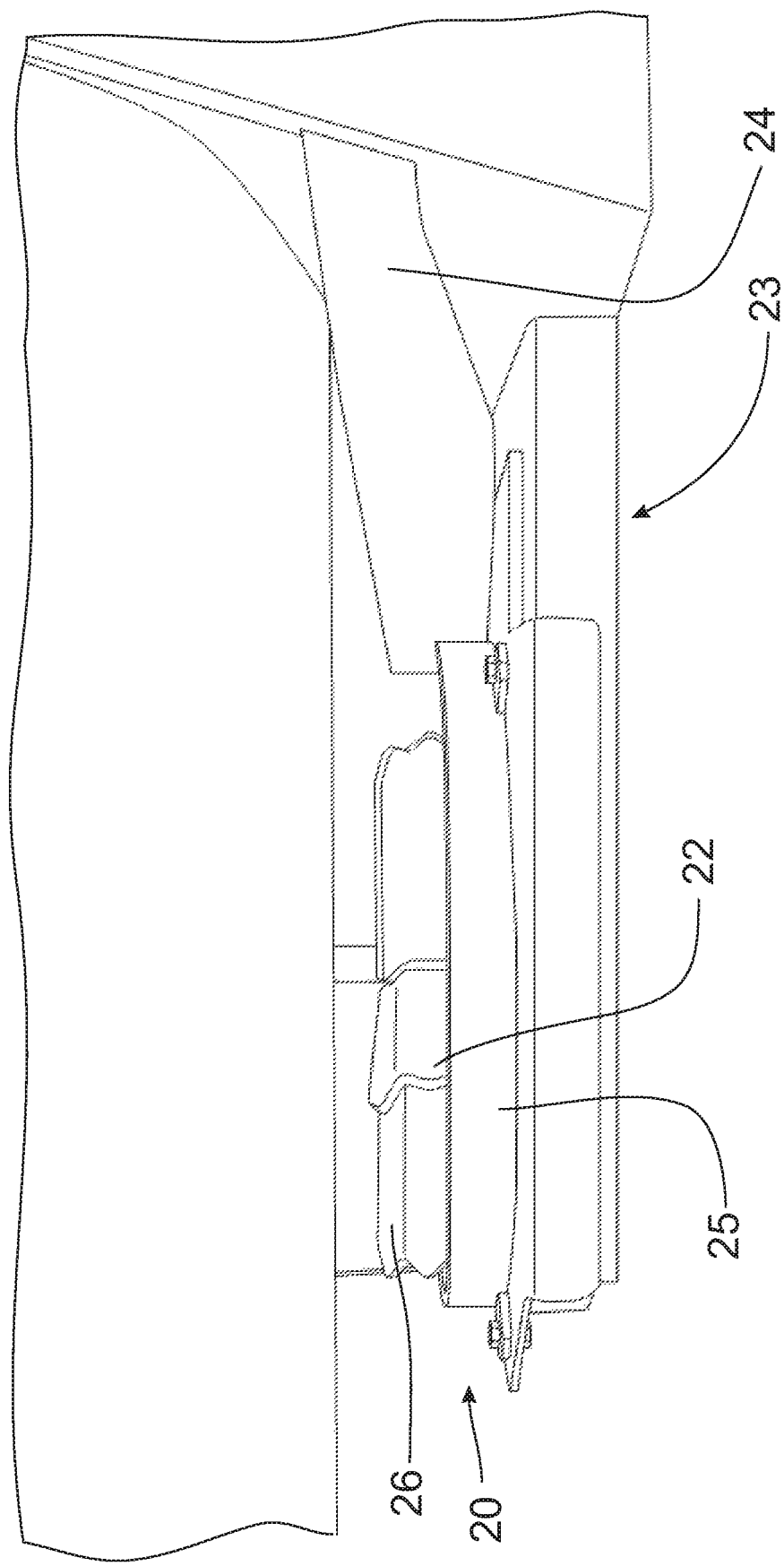
FIG. 9 is an enlarged partial front elevational view of the right distribution channel and right spinner for distributing material from the bucket.
Figure 10:
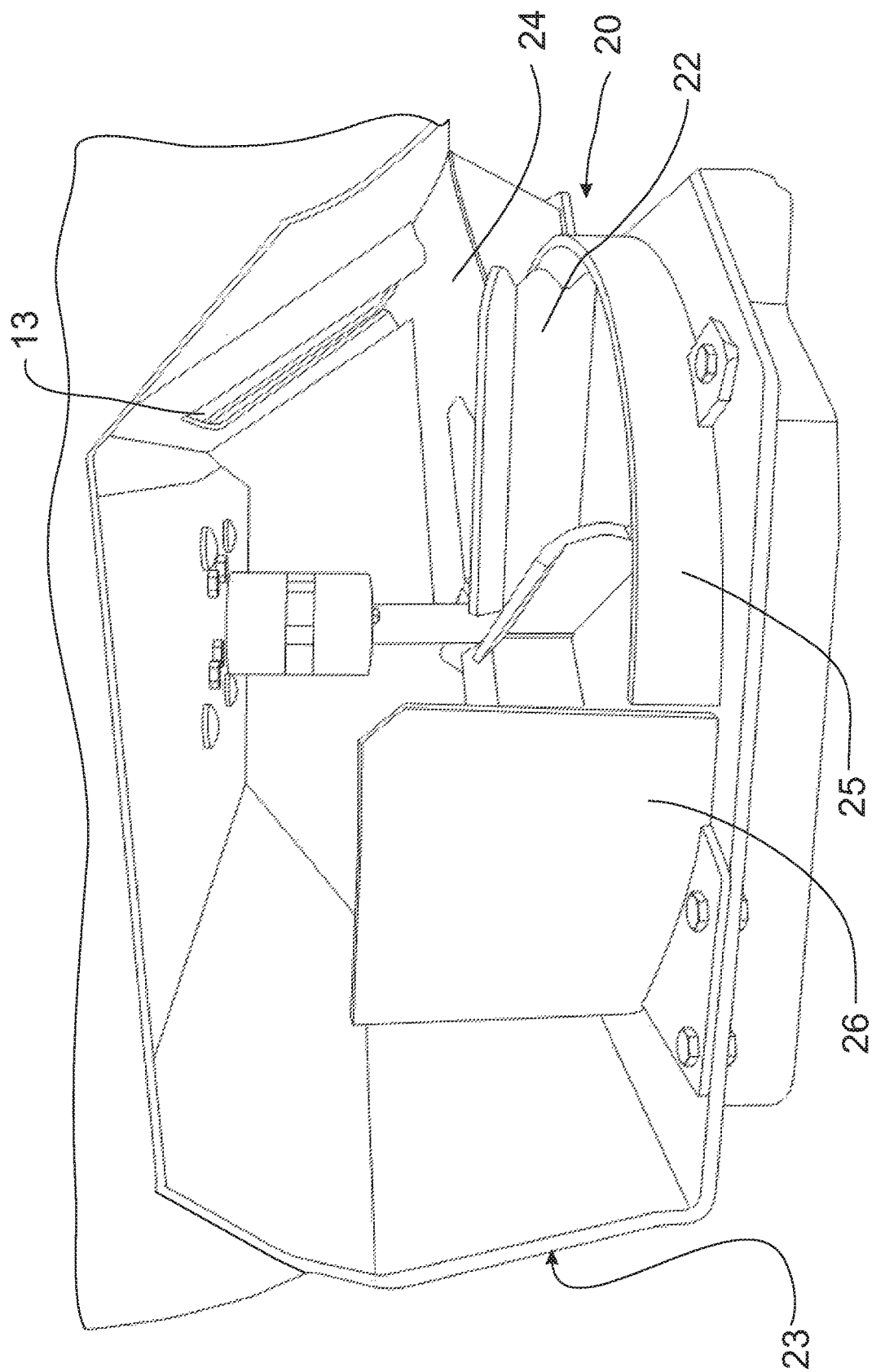
FIG. 10 is an enlarged partial right elevational view of the right spinner.
Figure 11:
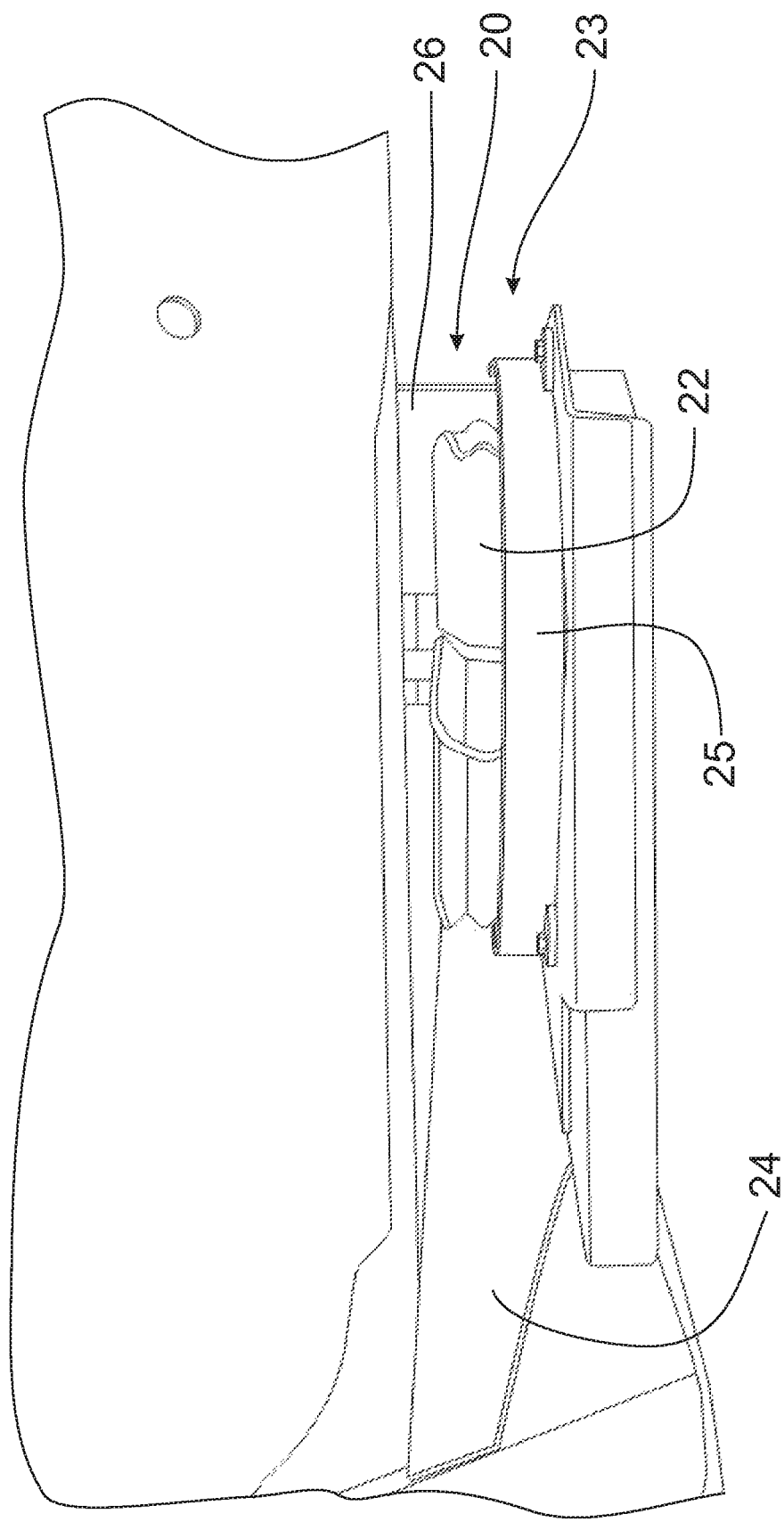
FIG. 11 is an enlarged partial front elevational view of the left distribution channel and left spinner for distributing material from the bucket.
Figure 12:
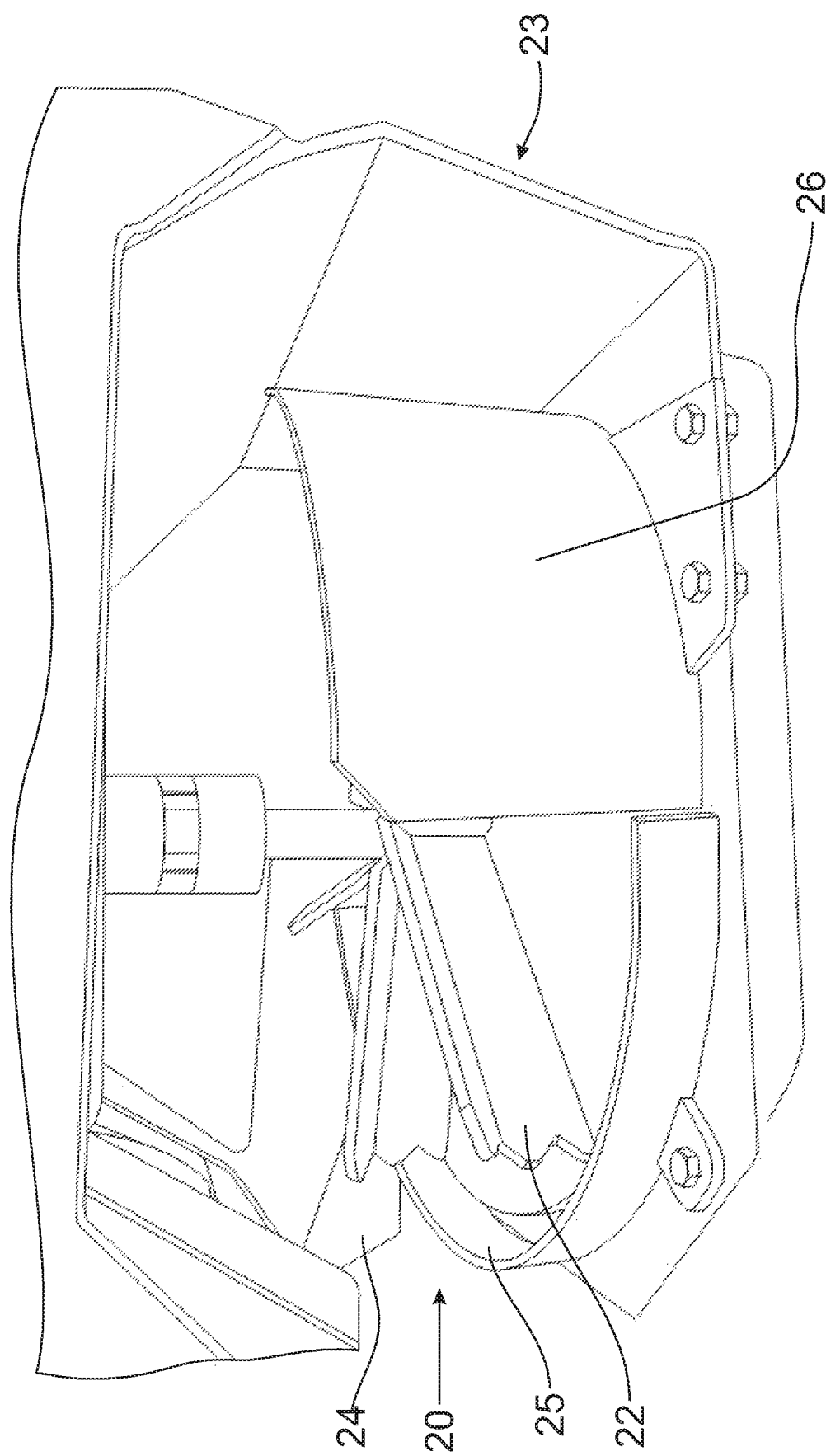
FIG. 12 is an enlarged partial left elevational view of the left spinner.
Figure 13:
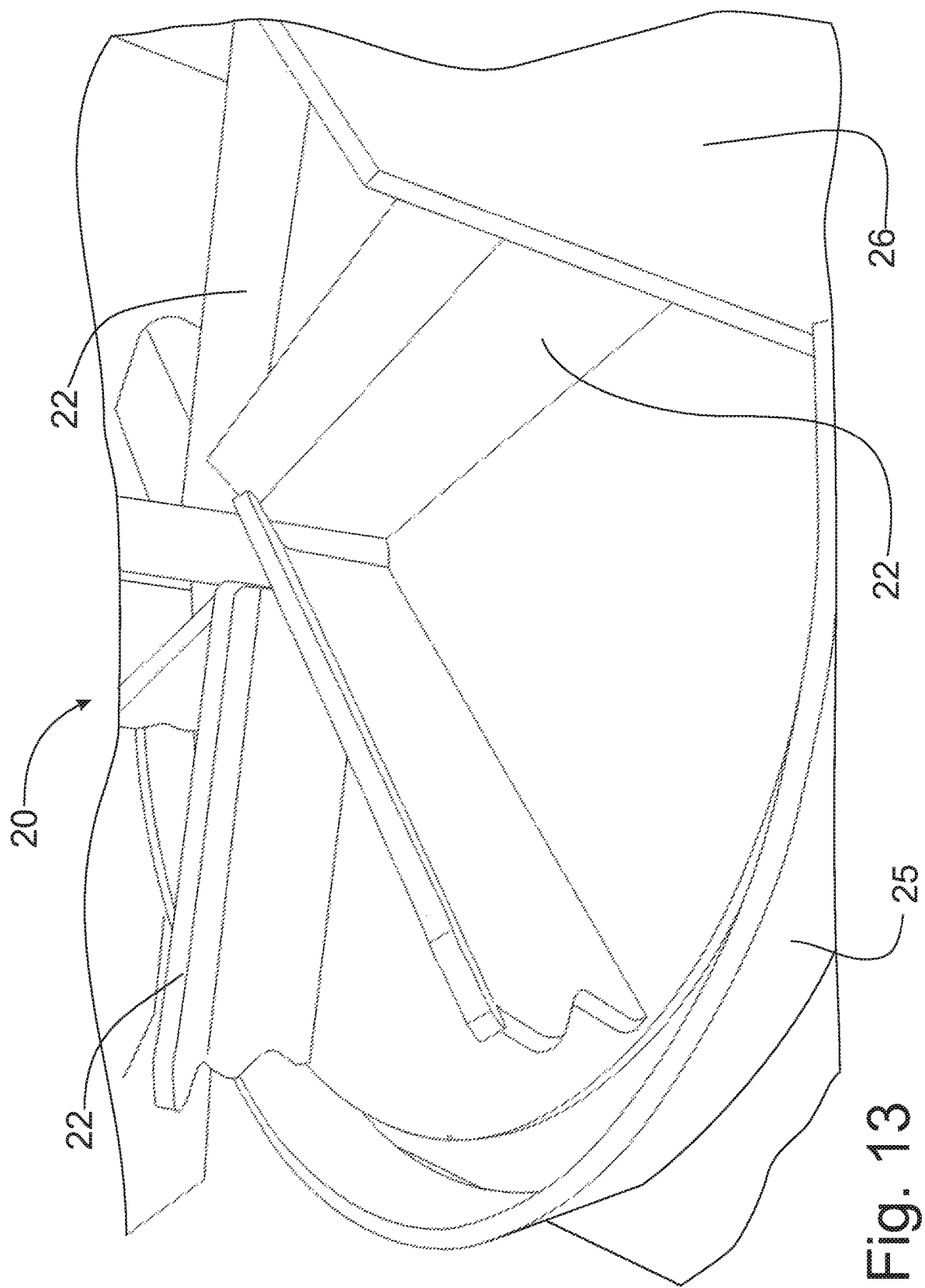
FIG. 13 is an enlarged partial perspective view of the left spinner.

The spinners 20 are rotatably powered by hydraulic motors 21 mounted above the spinners 20, as seen in FIGS. 7 and 8, so as to be positioned in a location that would not subject the motors 21 to damage from the operation of the spreading apparatus 10. Furthermore, the spinners 20 are located below the lower apex of the bucket 11 but positioned rearwardly thereof so that the spinners 20 are above the plane of the front side of the bucket 11 when the bucket 11 is lowered to scoop bedding material, as is depicted in FIG. 2. Each spinner 20 is rotated in a counter direction relative to the opposing spinner 20 so that the spinner blades 22 are rotated, when viewed from above, to move from the center of the bucket 11 toward the outside of the bucket 11 along the forward face of the spinner 20.

As best seen in FIGS. 1 and 9-12, each spinner 20 is rotatable within a horizontal distribution channel 23 that is open from the interior side of the forward face of the spinner 20 rotation to a position that is laterally of the bucket 11. The distribution channel 23 has a first inward boundary member 24 that is preferably oriented in a manner so as to be non-parallel to the direction of travel with the forward end of the boundary member 24 being closer to the center of the bucket 11 than the rearward end thereof. As a result, each spinner 20 has a clear, open path of distribution that extends for more than 90 degrees along the forward and side faces of the spinner rotation that allows the bedding material to be spread both forwardly of the bucket 11, as well as laterally of the bucket 11. Accordingly, the spreader apparatus 10 is operable to spread bedding material along a path that is forwardly of the bucket 11 and to both lateral sides of the bucket 11 simultaneously, assuming that both gate members 14 are raised to allow a free flow of material through the respective openings 13.

Each spinner 20 is also provided with a circular low baffle 25 that is centered on the axis of rotation of the respective spinner 20 and extends around the open distribution path for the spinner 20. The low baffle 25 has a height that is less than the height of the spinner blades 22, as is best seen in FIGS. 9-13. The low baffle 25 terminates adjacent a high baffle 26 at the rear lateral side of the spinner 20. The high baffle 26 has a height at least as high as the spinner blades 22 so that the high baffle 26 blocks the movement of the bedding material from the spinner 20. Accordingly, the high baffle 26 is positioned to provide a second boundary limit to the lateral distribution of the bedding material from the spinner 20. The low baffle 25, however, forces a portion of the distribution of bedding material from the spinner blades 22 into an upward direction which, in turn, causes the bedding material to come out of the spinners 20 in a fluffy pattern that provides a very uniform layer of distribution of the bedding material across the distribution path of the spreader apparatus 10, both forwardly and laterally from the spreader apparatus 10, which is advantageous in both free stall dairy barns and in chicken houses.

From a dimensional standpoint, each spinner 20 can have a diameter of approximately seventeen inches and includes two to six spinner blades 22 projecting vertically from a generally horizontal plate. Each spinner blade 22 has a height of approximately three inches, while the low baffle 25 has a height of approximately one and a half inches, corresponding to approximately half the height of the spinner blades 22. The high baffle 26 has a height of approximately three inches or more to block the discharge from the spinner blades 22. Preferably, each spinner blade 22 is formed in a bent configuration with the top portion bent into the direction of rotation of the spinner 20 to enhance the discharge characteristics of the spinner blades 22. Furthermore, each spinner blade 22 is preferably formed with a distal end portion that is toothed to be aggressive in the engagement of the bedding material flowing from the openings 13.

In operation, the spreader apparatus 10 is mounted on a loader plate (not shown) of an operable loader, such as a tractor-mounted front end loader or a skid steer loader or other prime mover, that includes a source of hydraulic fluid under pressure. The hydraulic system 30 of the spreader apparatus 10 is connected to the source of hydraulic fluid under pressure through hoses 31 to provide operative hydraulic power to the hydraulic motors 18, 21 driving the auger 15 internally of the loader bucket 11 and the spinners 20. Preferably, the hydraulic system 30 includes hoses 33 that deliver hydraulic fluid to and return hydraulic fluid from a diverter valve 32 that directs the hydraulic fluid to the respective hydraulic motors 18, 21.

The operation of the mounting plate (not shown) in a conventional manner through the hydraulic system of the prime mover (not shown) is operable to cause the mounting plate to be raised and lowered vertically, as well as to be tipped forwardly and rearwardly. The forward tipping of the mounting plate (not shown) will cause the top of the bucket 11 to move forwardly of the bottom of the bucket 11 to position the front wall 11a of the bucket 11 when in the upright orientation to be located parallel to the surface of the ground, thereby positioning the top of the bucket 11 in a forwardly open orientation to engage a pile of bedding material. Forward movement of the prime mover will cause the bedding material to enter the bucket 11 whereupon the mounting plate is tipped back to return the bucket 11 to the upright orientation with the interior of the bucket 11 filled with bedding material to be distributed.

Movement of the prime mover to a place where the bedding material is to be distributed, such as a free stall dairy barn or a chicken house as examples, will locate the spreader apparatus 10 in a position to operate the spinners 20 for distribution of the bedding material. Opening the gate members 14, will allow the flow of the bedding material from the auger 15 within the interior of the bucket 11 onto the spinners 20. Rotation of the auger 15 in an undershot manner as described above feeds the bedding material through the openings 13 onto the rotating spinners 20 driven by the hydraulic motors 21 in a manner to discharge the bedding material through the distribution channel 23 that is opened both forwardly and laterally of the bucket 11. The rotation of the anti-bridging member 19 above the auger 15 keeps the bedding material from bridging above the auger 15 and moves the bedding material downwardly into engagement with the auger 15.

The provision of the low baffle 25 around the opened circumference of the rotation path of the spinner blades 22 establishes a discharge pattern that creates a uniform layer of bedding material along the distribution path of the spinners 20. The low baffle 25 forces a portion of the bedding material being discharged off of the spinner blades 22 into an upward direction that engages the bedding material discharged off of the spinner blades 22 above the low baffle 25 and creates a uniform discharge pattern from the spinner blades 22 across the entire distribution path of the spinners 20. By operating the prime mover (not shown) in a rearward direction as the bedding material is being distributed, the layer of bedding material discharged by the spreader apparatus 10 will be uniform and undisturbed both forwardly and laterally of the spreader apparatus 10.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A spreader apparatus for distributing bedding material within a farm structure, comprising:
a loader bucket having an upright forward wall, an opposing upright rearward wall, opposing upright side walls extending between said forward and rearward walls, an open top defined by an upper terminus of said walls, and a closed bottom defining a lower apex as a lowermost point in an interior cavity formed by said forward, rearward, and side walls and said closed bottom for retaining a supply of said bedding material, said rearward wall having opposing openings therein at said lower apex proximate to each respective said side wall;
an auger rotatably mounted at the bottom of said loader bucket above said lower apex to convey said bedding material to lateral sides of said loader bucket for discharge through said respective openings;
a pair of spinner members supported on said loader bucket rearwardly of said rearward wall in communication with respective openings to receive said bedding material therefrom, each said spinner being rotatable to discharge the bedding material from the loader bucket, each spinner including upright spinner blades having a first height dimension;
a pair of opposing distribution channels formed below said lower apex in respective communication with spinners, each said distribution channel directing the discharge of the corresponding said spinner externally of said loader bucket, each said distribution channel including a high baffle having a third height dimension at least equal to said first height dimension and being located behind and laterally of the corresponding said spinner to block discharge of material, each said high baffle having a forward terminus rearwardly of a vertical axis of rotation of the corresponding spinner; and
a low baffle supported in each said distribution channel and being mounted circumferentially with respect to the corresponding said spinner, each said low baffle having a second height dimension that is less than said first height dimension of said spinner blades, each said low baffle extending circumferentially to the corresponding said spinner from the forward terminus of said high baffle, said low baffle causing material to be deflected upwardly into the discharge of material from said spinners above the corresponding low baffle;
wherein each said distribution channel further includes a first boundary member to direct material discharged from the corresponding said spinner forwardly, each said first boundary member being non-parallel with respect to said direction of travel with a forward portion of each said first boundary member being closer to the opposing spinner than a rearward portion of said first boundary member, said distribution channels being open from said channels are open from a first boundary member extending forwardly of said loader bucket to a second boundary member positioned laterally of said loader bucket such that each said spinner is operable to distribute said bedding material both forwardly and laterally of said loader bucket.

2. The spreader apparatus of claim 1 said high baffle defines said second boundary member of said distribution channel and with said first boundary member limits the distribution of said bedding material in said lateral direction from said loader bucket.

3. The spreader apparatus of claim 2 wherein said auger is rotated in a manner to present an undershot feed of bedding material through the respective said opening onto the corresponding said spinner.

4. The spreader apparatus of claim 3 wherein said spinners are rotated such that a forward face of the rotating spinner has the spinner blades moving from forwardly of said loader bucket to laterally of said loader bucket.

5. The spreader apparatus of claim 4 wherein each said opening is provided with a gate member movable relative to said rearward wall of said loader bucket to control the size of said opening through which said bedding material is fed onto the corresponding said spinner.

6. The spreader apparatus of claim 4 wherein said spinners are supported on said loader bucket at a position that is rearward of said rearward wall and below said apex so that said spinners are above a plane of said forward wall when said loader bucket is oriented in a lowered position to load said bedding material into said interior cavity.

\* \* \* \* \*